Jan. 4, 1949.  E. T. BARTLETT  2,458,239
SUPPORT FOR FOWL OR THE LIKE
Filed Oct. 17, 1946

INVENTOR.
EDWARD T. BARTLETT
BY
Leonard L. Kalish

Patented Jan. 4, 1949

2,458,239

UNITED STATES PATENT OFFICE 2,458,239

SUPPORT FOR FOWL OR THE LIKE

Edward T. Bartlett, Philadelphia, Pa.

Application October 17, 1946, Serial No. 703,894

2 Claims. (Cl. 99—419)

The present invention relates to baking or roasting utensils and it relates more particularly to a certain new and useful device for supporting fowl or the like during roasting or the like.

An object of the present invention is to provide a simple, inexpensive and convenient utensil for supporting fowl or the like during roasting etc. Another object of the present invention is to provide a simple, inexpensive and effective spit which will support fowl or cuts of beef etc. during roasting and which can be readily adjusted for size and which can be safely stored in a relatively compact space.

Other objects and advantages of the present invention are apparent in the following detailed description, appended claims and accompanying drawings.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1:
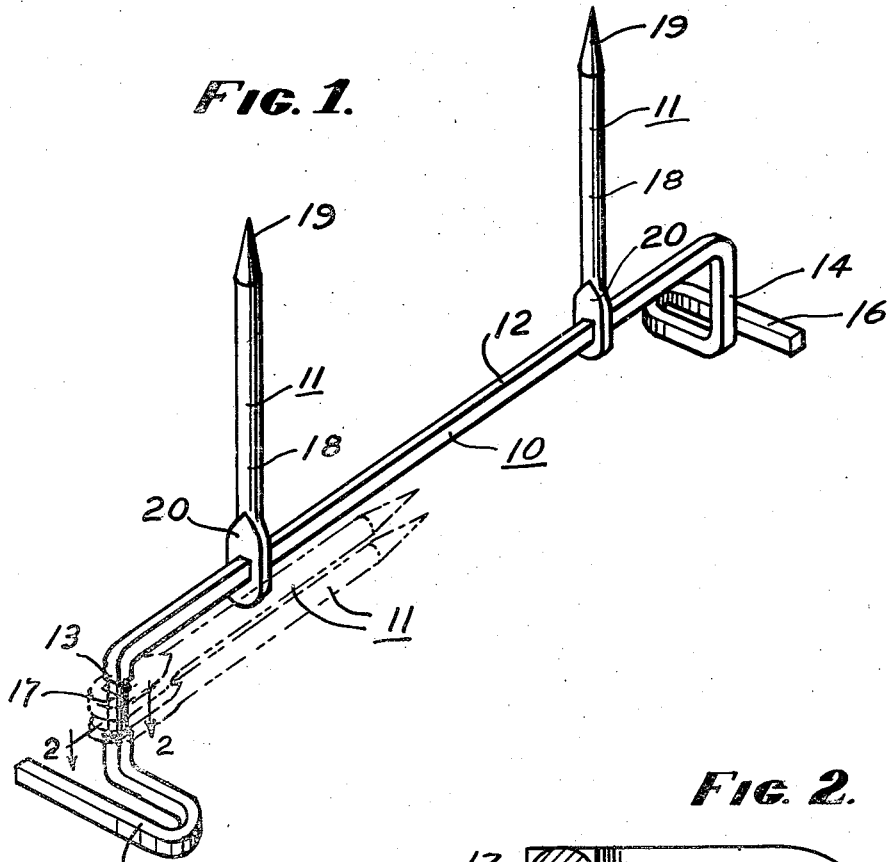
Figure 1 represents a perspective view of one embodiment of the present invention as it appears in position ready to support a fowl or the like; the position of the impailing prongs during storage being shown in dash-dot lines.

In one embodiment of the present invention shown generally in Figures 1 and 2 I may provide a supporting member or base 10 on which a plurality (for example two) of impaling members 11 are mounted in a manner to be hereinafter described.

The base 10 may be formed in one piece from a rod of metal or the like having rectangular or other non-circular cross-section.

The base 10 includes a generally horizontally extending central portion 12 having downwardly-extending portions 13 and 14 respectively formed at its ends.

At the lower ends of the portions 13 and 14 are provided reversely-curved horizontal feet or supports 15 and 16 respectively.

Figure 2:
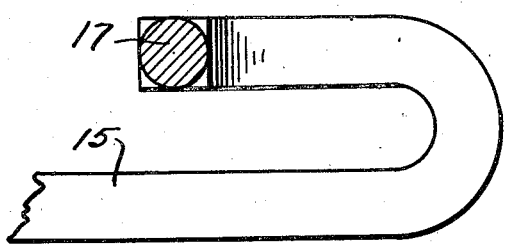
Figure 2 represents a cross-sectional view generally along the line 2—2 of Figure 1.

The downwardly-extending portion 13 is provided with an intermediate portion 17 which has been turned or otherwise formed to a circular cross-section having a dimension no greater than the smallest transverse dimension of the rectangular portion, as indicated particularly in Figure 2.

Each of the impailing prongs 11 includes an elongated main portion or stem 18, a sharpened tip or point 19 at the upper end of said stem 18 and a flattened lower portion 20.

Each flattened portion 20 is provided with a rectangular (or other non-circular) hole adapted to fit over the rectangular portion of the base 10.

The prongs 11 can be positioned upon the base 10 by inserting the free end of either of the horizontal feet 15 and 16 into the opening formed in the portion 20, so that the stem 18 is in upright generally vertical position. Each of the prongs 11 is then slid over the curved portions of the feet 15 and 16 and the vertical portions 13 and 14 and upon the central horizontal portion 12 to the position shown in the solid lines in Figure 1. The openings in the flattened portions 20 are slightly oversized relative to the rectangular portion of the base 10 so that they can be moved easily around the rather sharp bends.

It is obvious that, with the impaling prongs 11 in the position shown in solid lines in Figure 1, they can be used to support a fowl or roast or the like during the roasting or baking or other cooking operation.

That is, after the fowl or roast or the like has been impaled upon the prongs 11, the entire device can be put in a roaster or in an oven or the like so that the fowl or roast is supported above the bottom of the pan or oven for most effective roasting and for ready access.

The prongs 11 can be moved either closer together or farther apart upon the central portion 12 of the base 10 to accommodate fowl or roasts or the like of different size.

When the novel support of the present invention is not in use, the prongs 11 can be moved to the circular part 17 of the portion 13. Due to the smaller diameter of the circular part 17, the prongs 11 are free to rotate thereabout so that they can be positioned, one below the other, underneath and parallel to the central portion 12 of the support 10, as shown in dash-dot lines in Figure 1.

In this way, the device takes up comparatively little space for packaging prior to sale and for storing.

While, for purposes of illustration, only two prongs 11 have been shown, it is within the scope of the present invention to provide three or four or any other number of prongs if particularly large size fowl or roasts are to be supported. Similarly, the vertical and horizontal dimensions of the base 10 and of the prongs 11 can be varied for different applications.

It is obvious that some or all of the impaling prongs 11 can be positioned so as to extend horizontally relative to the portion 12 of the base 10, by simply rotating the prongs 11 a quarter-turn clockwise or counterclockwise before inserting the free ends of the feet 15 and 16 into the holes in the flattened portions 20.

It is also obvious that, if the vertical dimension of the portions 13 and 14 is made greater than that of the prongs 11, the prongs can be positioned so as to extend vertically downward from the portion 12 by simply turning the prongs 11 a half-turn before positioning them upon the base 10.

It is also apparent that the prongs 11 can be changed quickly and easily from the vertical upward position to the horizontal position or to the vertical downward position by simply moving them on to the circular part 17 and rotating them a quarter-turn or a half-turn, and thereafter moving them back to the central portion 12.

The novel support of the present invention may be constructed of stainless steel or any other appropriate material which can be easily cleaned and which will not affect the edible characteristics of the fowl or roast etc., and which is capable of withstanding elevated temperatures.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention, I claim as new and desire to protect by Letters Patent:

1. A support for fowl or the like comprising a base having a central elongated horizontal portion of non-circular cross-section, said base having a pair of vertical portions extending downward from the ends of said central portion, one of said vertical portions being provided with a portion having a reduced-diameter circular cross-section, and a plurality of impaling prongs slidably mounted upon said base, said prongs having non-circular openings formed therein, whereby said prongs can be positioned in non-rotating relationship relative to the non-circular portion of said base and whereby said prongs can be positioned in rotatable relationship to the reduced-diameter circular portion of said base.

2. A support for fowl or the like comprising a base formed integrally of a rod of metal or the like having rectangular cross-section, said base including a generally horizontal central portion and end portions extending downward from said central portion, said base having a portion formed with reduced-diameter circular cross-section, and a plurality of impaling prongs slidably mounted upon said base, said prongs having openings formed therein corresponding to the rectangular cross-section of said base whereby said prongs can be positioned in non-rotatable relationship to the central horizontal portion of said base and whereby said prongs can be positioned in rotatable relationship upon the circular portion of said base.

EDWARD T. BARTLETT.

No references cited.